Dec. 23, 1958 W. W. PHARIS 2,865,999

GROUP SIGNALING TELEPHONE SYSTEM

Filed Nov. 2, 1956 5 Sheets-Sheet 1

INVENTOR.
WILLIAM W. PHARIS

BY [signature]

AGENT

Dec. 23, 1958 W. W. PHARIS 2,865,999

GROUP SIGNALING TELEPHONE SYSTEM

Filed Nov. 2, 1956 5 Sheets-Sheet 3

Dec. 23, 1958 W. W. PHARIS 2,865,999

GROUP SIGNALING TELEPHONE SYSTEM

Filed Nov. 2, 1956

5 Sheets-Sheet 4

2,865,999
Patented Dec. 23, 1958

2,865,999

GROUP SIGNALING TELEPHONE SYSTEM

William W. Pharis, Rochester, N. Y., assignor to General Dynamics Corporation, Rochester, N. Y., a corporation of Delaware Application November 2, 1956, Serial No. 620,111
7 Claims. (Cl. 179—5)

My invention relates to telephone systems in general and more particularly to telephone systems equipped for group signaling such as fire alarm systems.

Fire alarm systems have been provided for use in a dial telephone system including a plurality of lines terminating in line circuits and switching apparatus and wherein calling and called ones of the lines may be interconnected by the directive operation of the switching apparatus. In such a system, it is usually the practice to provide an auxiliary line circuit for each telephone line assigned to the subscriber to whom emergency service messages are to be transmitted, such as the lines assigned to the homes of volunteer firemen. The system usually is arranged for a subscriber requiring emergency service to reach an input channel common to all the auxiliary line circuits by directively operating the switching apparatus, and thereafter to operate apparatus within each auxiliary line circuit in order to simultaneously transmit conventional ringing signals over the emergency service lines. Such systems may also be arranged so that the auxiliary line circuits are effective for detecting a busy condition on the corresponding line and thereupon applying a distinctive, waiting tone to that line in order to inform the users that an emergency call is waiting.

In the past, such systems have not been arranged to provide for the contingency where one of the emergency service line stations wishes to contact the remaining emergency service line stations. Thus, with the above described system, such an attempt would result in the application of the waiting tone from the auxiliary line circuit of the calling line and to the calling station; in turn, the tone would be transmitted through the switching apparatus to the common input channel and to the called emergency line stations. Under these conditions, it would be necessary to hold the conversation over the distinctive waiting tone.

Accordingly, it is an object of my invention to provide a new and improved group signaling telephone system.

Another object of my invention is to provide a group signaling system in which all stations including emergency stations may originate calls over the group signaling apparatus without interruption by the distinctive waiting tone.

Another object of my invention is to provide a new and improved method of applying distinctive waiting tone to the busy emergency service lines of the system.

I accomplish these and other objects in a telephone system which includes a plurality of lines, each of which is terminated at a dial office on a line circuit, and wherein switching apparatus within the dial office is effective for interconnecting and making busy calling and called ones of the lines. Among the plurality of lines, certain ones are arranged to receive calls for emergency service in addition to their normal function of originating and receiving calls in the above described manner. To this end, each emergency service line is also connected to an individual auxiliary line circuit located within the dial office. A common input channel is provided for the auxiliary line circuits so that speech signals put into the channel are transmitted under conditions to be described presently to all the emergency service lines.

Each auxiliary line circuit is equipped with means for transmitting the well-known low frequency ringing signals over the corresponding one of the lines when tne latter is in idle condition and which is effective upon the transmission of an off-hook signal from the emergency service line for interconnecting the corresponding emergency service line and the common input channel. Each auxiliary line circuit is also equipped with busy condition detecting means responsive to a busy condition on the corresponding line for transmitting a distinctive waiting tone signal over the line to the telephone station connected to the line and which is operative when the corresponding line is in idle condition for making the signaling-interconnecting means operative. Each auxiliary line circuit also includes supervisory means operative in response to the operation of the interconnecting means and to the transmission of an off-hook signal from the corresponding line for indicating that the line is in condition to receive the emergency service message.

The previously mentioned common input channel is a part of an access circuit which is seized by extending a connection from the calling line ( i. e., the one requesting emergency service) through the switching apparatus. Upon seizure of the access circuit, a connection is thereupon completed from the calling line to the common input channel. The access circuit includes switchthrough means for making the busy condition detecting means of all auxiliary line circuits operative. The access circuit also includes means responsive to seizure for making the switchthrough means effective, whereby the busy condition detecting means of all the auxiliary line circuits is made operative in order to place waiting tone on the busy ones of the emergency service lines and in order to signal and thereafter interconnect the idle ones of the emergency lines to the common input channel.

The switching apparatus is provided with the well-known means for releasing itself and for releasing the seizure responsive means within the access circuit. Because the releasing means is under the control of the calling line, the switching apparatus and the seizure responsive means within the access circuit may be released by the calling line and thereby disconnected from the common input channel.

In order to make it possible for the emergency lines to communicate with each other following the release of the switching apparatus and the access circuit seizure responsive means, the access circuit is also provided with common supervisory means operative in response to the operation of the supervisory means individual to any one of the auxiliary line circuits for holding the switchthrough means in its operated condition. With the above described arrangement, any of the lines including one of the emergency lines may originate a call through the switching apparatus to the access circuit and signal the emergency lines. Upon the establishment of a connection from the calling emergency service line to the access circuit, waiting tone is heard at the calling line station. In order to get rid of the waiting tone, the calling line releases the switching apparatus by hanging up the calling line station telephone. Thereupon, the busy condition detecting means of the auxiliary line circuit individual to the calling station causes the ringing-interconnecting means to be operative. Thereafter, the calling, emergency line station telephone is again removed from its hookswitch so that the calling station may talk to the stations on the other emergency lines through the connection established to the common input circuit by way of the auxiliary line circuit individual to the calling station.

In order to prevent the auxiliary line circuits from being indefinitely held by the failure of one of the emergency line stations to return its telephone to its hookswitch, timing apparatus is provided for controlling the switchthrough means. Thus, when the seizure responsive means within the access circuit is released at the conclusion of the requirement for a connection from the calling line to the common input channel, the timing means is operative in response to the operation of the common supervisory means for making the switchthrough means ineffective a predetermined time interval after the release of the access circuit seizure responsive means.

For a better understanding of my invention, reference is made in the following description to the drawings affixed to and forming a part of this specification, and in which:

Fig. 6 shows the order in which Figs. 1–5 are to be arranged.

Figure 1:
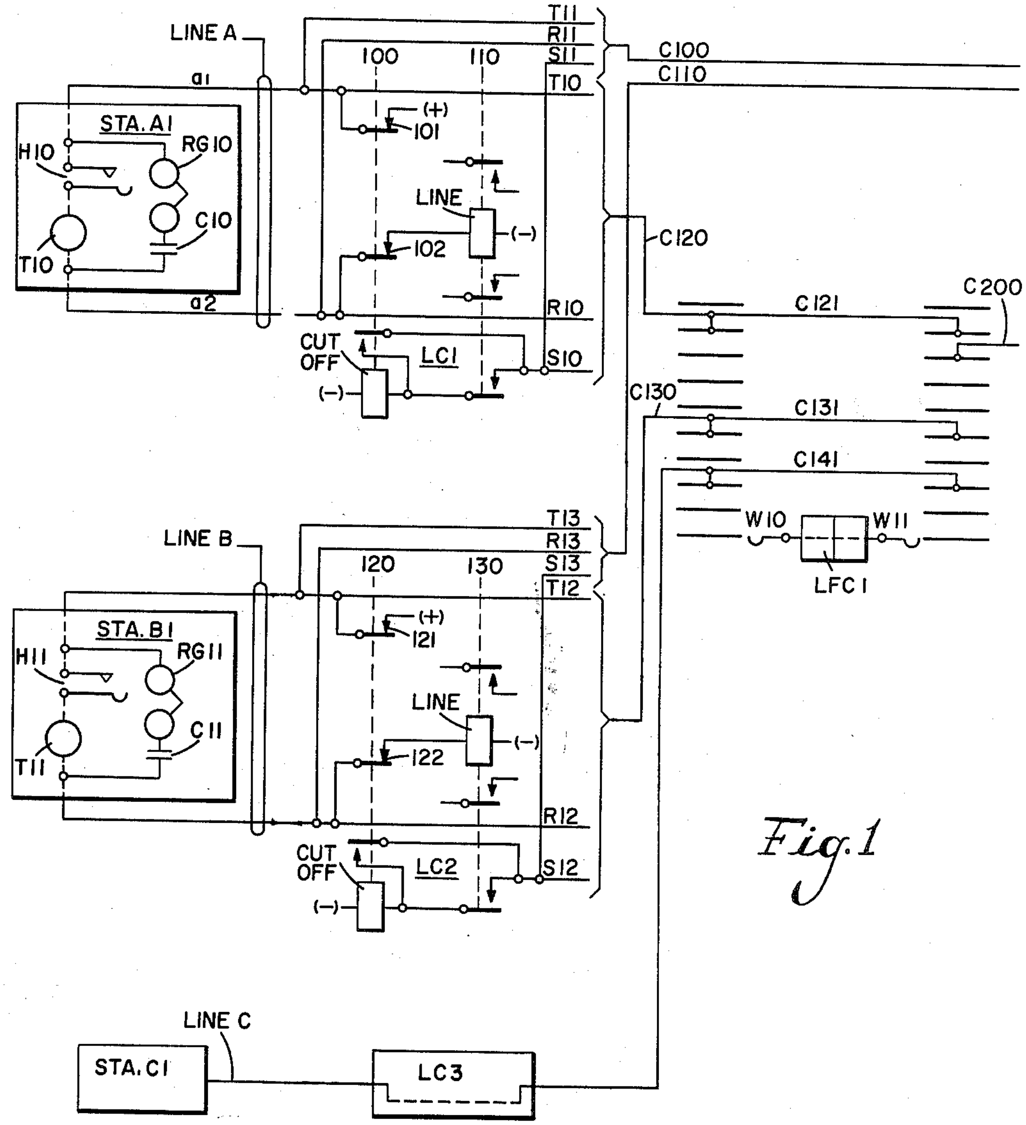
Fig. 1 shows schematic representations of subscriber stations, lines and line circuits suitable for receiving emergency service signals, as well as a block representation of dial switching appaartus suitable for use in a central office.
Figure 6:
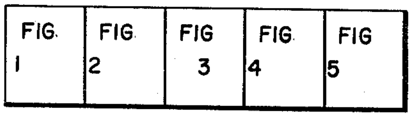

Power for the apparatus described in the following paragraphs is drawn from a number of sources. The first of these is a battery, the most positive plate or terminal of which is connected to ground and is hereinafter referred to as "ground" and in the drawings as (+); the most negative, ungrounded terminal or plate is referred to as "battery" and in the drawings as (—). A second source of power is the well-known telephone ringing generator supply including a low frequency alternating current generator in series with the battery. Thus, one side of the generator is grounded through the battery and is hereinafter referred to as "ground" and in the drawings as (+); the output side of the generator is referred to as "generator" and in the drawings as (±). Still another power source is the low impedance, ground-connected dial tone coil, well-known in the telephone industry. Still another source of power is the well-known motor driven interrupter for producing timed ground signals of various duration which are more fully described later.

The telephone system in which the preferred embodiment of my invention is incorporated includes a plurality of lines such as A, B, and C, shown in Fig. 1. Each of these lines is terminated individually on a line circuit, such as LC1, LC2 and LC3. Switching apparatus within the system, such as the well-known step-by-step type line finder-connector LFC1, is effective in the manner well understood by those skilled in the telephone art for interconnecting the station on a calling one of the lines to a called one of the lines and its station. The operation of the switching apparatus which is next described is confined to generalities because the apparatus within the switching equipment does not form a part of my invention and because the operation of such apparatus is well understood to those skilled in the telephone art.

Assuming that a connection is to be extended from calling station A1 and line A, the removal of the telephone from its hookswitch at station A is effective for closing hookswitch contact H10, thereby completing a short, including transmitter T10, between conductors *a1* and *a2* of line A. The completion of such a short completes an operating circuit for line relay 110 in line circuit LC1 which is traced from battery through the winding of relay 110, break contacts 102, conductor *a2*, the short between conductors *a2* and *a1*, conductor *a1*, and break contacts 101 to ground. The operation of relay 110 is effective for causing apparatus, not shown, to assign an idle linefinder-connector link, such as LFC1, to the call and thereby cause the wiper set of linefinder-connector LFC1, shown collectively as W10, to be advanced within the linefinder multiple bank until the wiper set engages the terminal set to the multipled line conductors, shown collectively as C120. The latter conductors connect the conductors of line A and line circuit LC1 to the corresponding line-finder conductors. After linefinder-connector LFC1 has completed the above described connection, ground from the linefinder-connector is passed back to sleeve conductor S10 to operate cutoff relay 100 within line circuit LC1 and to apply busy marking ground to the corresponding sleeve terminal with the connector bank multiple through the conductor, shown collectively as C121, whereby line A and line circuit LC1 are marked busy to other switching apparatus within the system. Thereafter, the connector portion of linefinder-connector LFC1 responds to trains of directive digit impulses transmitted from calling station A dial contacts, not shown, in order to directively advance the wiper set of the connector, shown collectively as W11, into engagement with the terminal set in the connector multiple to which the required called line is connected. Thereafter, the connector is effective for connecting generator and ground to the called line in order to signal the called line station, and for thereafter interconnecting the calling and called lines and stations.

Figure 2:
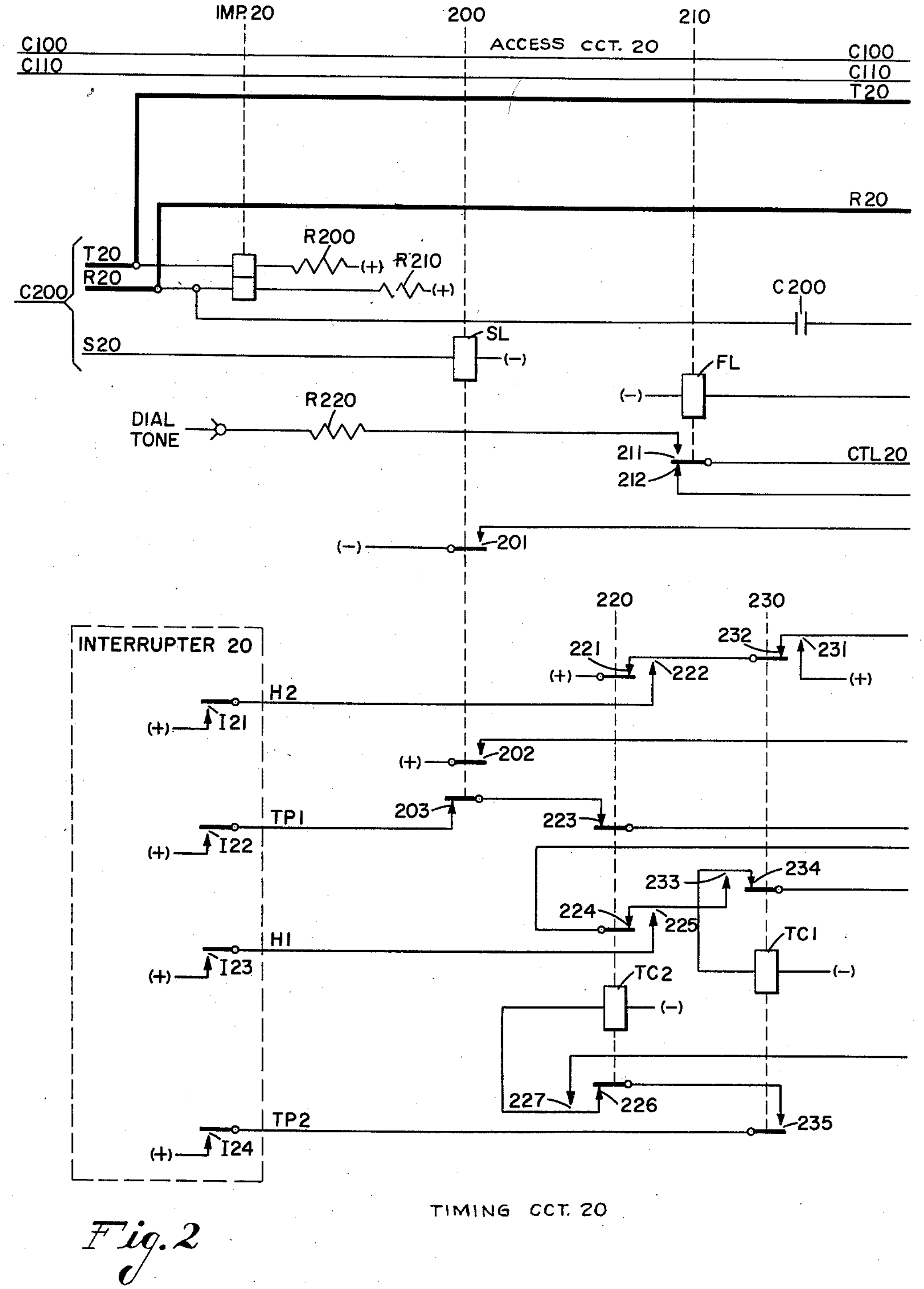
Fig. 2 shows a schematic representation of an access circuit and a timing circuit.
Figure 4:
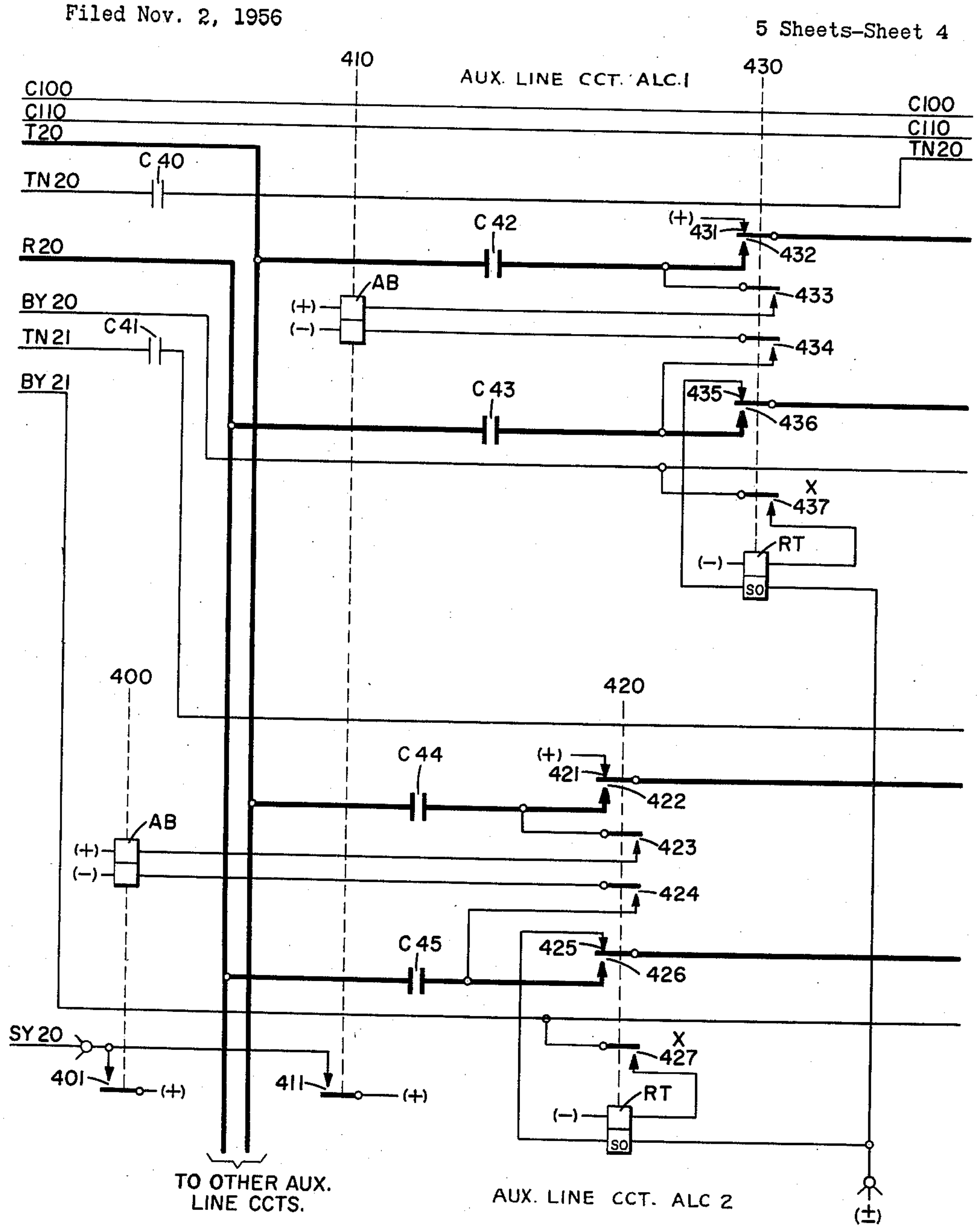
Fig. 4 shows parts of first and second auxiliary line circuits.
Figure 5:
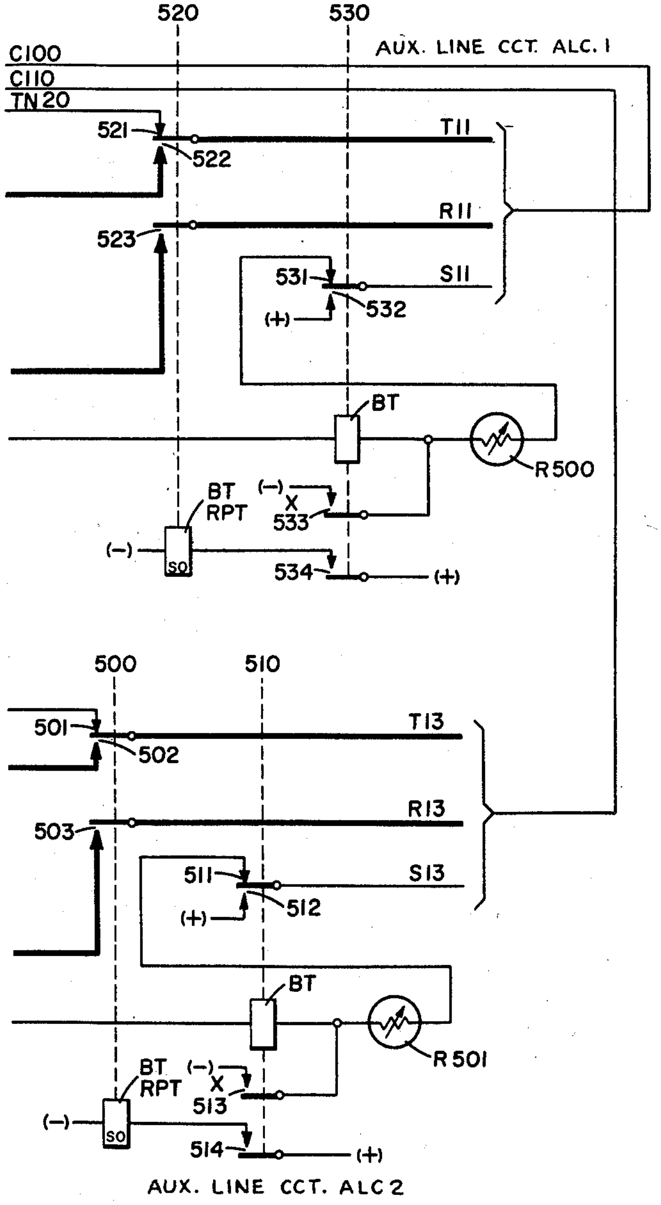
Fig. 5 shows the remainder of auxiliary line circuits.

Certain of the lines in the system, such as line A and line B, are equipped with auxiliary line circuits of the type shown in Figs. 4 and 5 in order to make group signaling and conference type connections with the stations on each of these lines possible. Thus, lines equipped with auxiliary line circuits may be used with lines connected to stations, such as those of volunteer firemen, which are to receive group, emergency service calls. Assuming that an emergency condition exists at station C, the station C telephone is removed from its hookswitch and a connection is extended in the above described manner through the switching apparatus to a predetermined terminal set within the connector multiple. An access circuit, such as access circuit 20 shown in Fig. 2 is connected to the terminal set within the connector multiple by conductors, shown collectively as C200. Upon the establishment of such a connection, means within the connector of the line finder-connector, such as LFC1, is effective in the well-known manner for connecting ground to sleeve conductor S20 in order to seize the access circuit and other means for connecting generator and ground to conductors T20 and R20, respectively, of the access circuit. The presence of ground connected to conductors T20 and R20 through the upper and lower high impedance windings of impedance coil 20 and resistors R200 and R210 within the access circuit is effective for causing the ring trip means within the connector to operate, thereby extending a connection from the calling station C through line finder-connector LFC1 to a common input channel including conductors T20 and R20 of the access circuit. The presence of ground on conductor S20 is effective for operating access circuit seizure responsive means including sleeve relay 200 over an obvious circuit.

Figure 3:
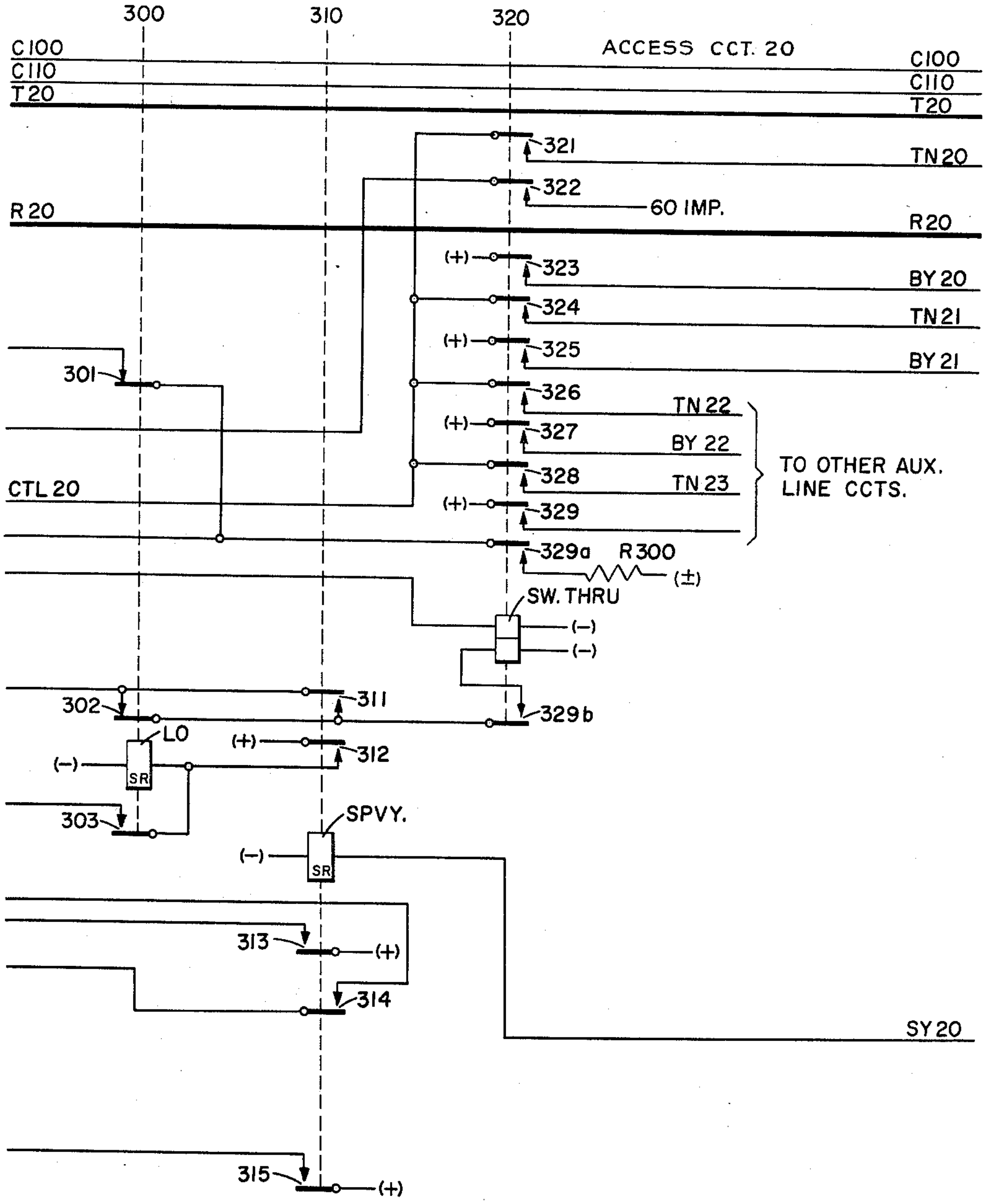
Fig. 3 shows the remainder of the access circuit.

The operation of relay 200 is effective for operating switchthrough means including switchthrough relay 320 by closing an obvious operating circuit at make contacts 201. The operation of relay 200 is further effective for preparing a locking circuit for lockout relay 300 at make contacts 202. The operation of relay 200 is further effective for disabling the timing means including the circuit shown in Fig. 3 (the purpose of which is to be explained presently) by disconnecting conductor TP1 from the timing circuit at break contacts 203.

The operation of relay 320 is effective for completing a locking circuit for itself from battery through the lower winding of relay 320, make contacts 329*b*, and break contacts 302, 232, and 221 to ground. However, relay 320 is held under the control of the above described operating circuit until a supervisory signal is transmitted to the access circuit from one of the auxiliary line circuits in the manner to be explained presently. Other effects of the operation of relay 320 are next explained.

Relay 320 is equipped with a plurality of contacts, two of which (321 and 323) are individual to each auxiliary line circuit, such as ALC1 shown in Figs. 4 and 5. One of each of these contact sets is effective for actuating busy condition detecting means within the individual auxiliary line circuit comprising busy test relay, such as 530, for making ringing interconnecting means (to be described presently) effective in the event the corresponding line is in an idle condition and effective for applying distinctive, emergency service waiting tone to the corresponding line in the event the corresponding line is in busy condition. The operation of relay 320 is also effective for applying reverting ring tone to the calling station from generator through resistor R300, make contacts 329a, break contacts 301, capacitor C200, conductor R20, the calling line loop by way of the talking path through the switching apparatus, conductor T20, the upper winding of impedance coil 20, and resistor R200 to ground. The application of reverting ring tone informs the calling, non-emergency station that signaling of emergency service lines has started. Assuming that the line A and line circuit LC1 are in idle condition at the time relay 320 is operated, the application of ground at contacts 323 to conductor BY20 is effective for causing relay 530 within corresponding auxiliary line circuit ALC1 to operate in series with the cutoff relay 100. The circuit is traced from ground through make contacts 323, conductor BY20, the winding of relay 530, thermistor R500, break contacts 531, conductor S11, and the winding of cutoff relay 100 to battery. Current flowing in the last traced circuit is insufficient to operate relay 100. Relay 530 thereupon operates to the point where preliminary make contacts X533 are closed. Thereupon, a circuit is completed for fully operating relay 530 from battery through make contacts X533, the winding of relay 530, conductor BY20, and make contacts 323 to ground.

The full operation of relay 530 is effective for applying direct ground to the sleeve conductor of the called line in order to operate cutoff relay 100 over an obvious circuit. The application of ground to the conductor S10 is effective for marking the emergency line circuit busy to the switching apparatus. The operation of relay 530 is further effective for completing an obvious energizing circuit for busy test repeater relay 520 at make contacts 534. Relay 520 thereupon operates and disconnects the winding of relay 530 from conductors S13 and S10 at break contacts 511.

The operation of relay 520 is effective for preparing a connection between the emergency service line and the common input channel and for completing a circuit for energizing the ringer at the station on the emergency line at make contacts 522 and 523. The signaling circuit is traced from generator through the lower winding of ring trip relay 430, break contacts 435, make contacts 523, conductor R11, conductor $a2$, capacitor C10, ringer RG10, conductor $a1$, conductor T11, make contacts 522, and break contacts 431 to ground. The ringer RG10 at emergency call receiving station A is thereupon energized until the station handset is removed from its hookswitch.

The removal of the station handset from its hookswitch is effective for completing a short between conductors $a1$ and $a2$ at the hookswitch contacts M10. Direct current from the generator thereupon passes through the lower winding of relay 430, causing relay 430 to operate to the point where preliminary make contacts X437 are closed. Thereupon, a circuit for fully operating relay 430 is completed from battery to the upper winding of relay 430, make contacts X437, conductor BY20, and make contacts 323 to ground.

The full operation of relay 430 is effective for disconnecting the above traced ringer energizing circuit at break contacts 431 and 435 and for completing a connection between the common input channel and the emergency service line A at make contacts 432 and 436. Each auxiliary line circuit talking channel is separated from the common input channel by blocking capacitors such as C42 and C43 in order to prevent the transmission of direct current supervisory signals from emergency service lines to the common input channel. The full operation of relay 430 is further effective for connecting supervisory means comprising the windings of answering bridge relay 410 to emergency service line 11A in order to indicate in the manner to be described that the emergency service lines are ready to receive speech signals from the common input channel and in order to energize transmitter T10 at station A. Relay 410 thereupon operates over a circuit traced from ground through the upper winding of relay 410, make contacts 433, 432 and 522, conductors T11 and $a1$, hookswitch contacts H10, transmitter T10, conductors $a2$ and R11, make contacts 523, 436 and 434, and the lower winding of relay 410 to battery. Relay 410 thereupon operates and transmits a ground supervisory signal to access circuit 20 over conductor SY20. Conductor SY20 is common to all the auxiliary line circuits.

The energization of conductor SY20 is effective to operate supervisory means including relay 310 within the access circuit 20. The circuit is traced, in the case of auxiliary line circuit ALC1, from ground through make contacts 411, conductor SY20, and the winding of relay 310 to battery. Relay 310 thereupon operates.

Returning to the point at which access circuit switch-through relay 320 operates, in the event that the emergency service line is in busy condition as indicated by the presence of ground on the sleeve conductor of the corresponding line circuit, busy test relay 530 fails to operate owing to the presence of ground potential on both its winding terminals. Thus, the operation of relay 320 is effective for applying ground to the left-hand terminal of relay 530 through make contacts 323 and conductor BY20; and ground is extended to the right-hand relay 530 through conductors S10, S11, break contacts 531 and thermistor 500.

The operation of relay 320 is effective in response to the released condition of relays 530 and 520 for applying a distinctive emergency service waiting tone to the busy emergency line. The circuit is traced from the common tone lead CTL20 through make contacts 321, conductor TY20, blocking capacitor C40, break contacts 521 and conductors T11 and $a1$ to the busy emergency station.

In order to provide a source of distinctive tone to be connected to conductor CTL20, I have provided flashing relay 210 to be alternately operated and released in order to alternately connect conductor CTL to dial tone and generator. To achieve the intermittent operation of relay 210, relay 320 is effective for applying an interrupted 60 impulse per minute ground signal to the winding of flashing relay 210. The circuit is traced from the 60 IPM conductor through make contacts 322 and the winding of relay 210 to battery. Thereafter, relay 210 operates and releases at the rate of 60 times a minute. During the time that relay 210 is in operated condition, conductor CTL20 is connected to the dial tone source through make contacts 211, resistor R220 and conductor DT. During the time that relay 210 is released, conductor CTL20 is connected to the generator through break contacts 212, make contacts 329a, and resistor R300. The application of this distinctive mixture of dial tone and ringing generator informs the user of the station on the busy emergency service line that an emergency call is waiting and that the station telephone should be returned to its hookswitch in order to release the connection, thereby removing the busy condition.

When the busy condition is removed from line circuit LC1 by the removal of ground from sleeve conductor S10, the short around the winding of relay 530 is removed.

Thereafter, the signaling and interconnecting means including relays 530 and 520 operate in the previously described manner in order to signal the emergency service line station and to prepare a connection between the emergency service line and the common input channels. Thereafter, relay 430 operates in order to complete the connection between the common input channel and the emergency line and makes the supervisory means individual to the auxiliary line circuit operative to signal the access circuit.

Returning to the consideration of supervisory relay 310 within the access circuit, the operation of relay 310 in the previously described manner is effective for closing an alternate holding path for switchthrough relay 320 from battery through the lower winding of relay 320, make contacts 329*b* and 311, and break contacts 232 and 221 to ground. The operation of relay 310 is further effective for closing an obvious operating circuit for lockout relay 300 at make contacts 312. The operation of relay 310 is further effective for preparing a locking circuit for conversation timing 1 relay 230 at make contacts 313 and for preparing an operating circuit for relay 230 at make contacts 314. The operation of relay 310 is further effective for preparing a locking circuit for conversation timing 2 relay 220 at make contacts 315.

The operation of lockout relay 300 is effective for completing a locking circuit for itself from ground through make contacts 202 and 303 and the winding of relay 300 to battery. With this arrangement, relay 300 is thereafter maintained in its operated condition until the connection through the switching equipment to the common talking channel is released and relay 200 released and until all emergency service line station telephones have been returned to their hookswitches and relay 310 released. The operation of relay 300 is effective for opening the above-described reverting ring tone circuit at break contacts 301, so that the reverting signal is removed from the calling line. The operation of relay 300 is further effective for opening the first described locking circuit for relay 320 at make contacts 302, so that relay 320 is thereafter held in its operated condition under the control of the access circuit sleeve relay at make contacts 201 and under the above-described alternate holding circuit including make contacts 311 of supervisory relay 310, which is in turn controlled from the called emergency line stations.

Thus, it is seen that after the supervisory signal has been received from any one of the called emergency line stations, the switchthrough relay 320, which is effective for maintaining the interconnecting means individual to each auxiliary line circuit in its operated condition, is maintaned operated independently of the original seizing path through the line finder-connector apparatus within the telephone system. With this arrangement, the calling station C telephone may be returned to its hookswitch in order to release the system switching apparatus from the above-described connection to the access circuit without disconnecting the emergency service receiving lines from the common input channel. The switching apparatus within the system releases in the manner well understood by those skilled in the telephone art, and removes ground from incoming sleeve conductor S20 within the access circuit. Relay 200 thereupon releases, de-energizing the upper winding of relay 320 at make contacts 201, opening the above-described locking circuit for relay 300 at make contacts 202. The release of relay 200 is further effective in response to the operation of supervisory relay 310 for rendering the timing circuit 20, shown in Fig. 2, operative by interconnecting conductor TP1 and the winding of conversation timing relay 230. The circuit is traced from conductor TP1 through break contacts 203 and 223, make contacts 314, break contacts 234, and the winding of relay 230 to battery.

Interrupter 20, shown in block form in Fig. 2, includes a continuously revolving set of cams which are effective for periodically operating various contact sets individual to the interrupter, such as I21 through I24. These contacts are thus closed and opened on a common time base for intervals to be described in the following paragraphs. As a result, timed ground signals are passed over conductors TP1, TP2, H1 and H2 to timing circuit 20.

In response to the interconnection of conductor TP1 to the winding of relay 230, the next occurring momentary ground signal on conductor TP1 is effective for operating relay 230 in order to indicate the start of a timed interval. The operation of relay 230 is effective for substituting ground at make contacts 231 for the ground supplied through break contacts 221 to the lower winding holding circuit of relay 320. The operation of relay 230 is further effective for preparing an operating circuit for conversation timing 2 relay 220 at make contacts 235. The operation of relay 230 is further effective for disconnecting its own above-described operating circuit at break contacts 234 and for substituting therefor a holding circuit which is traced from ground through make contacts 313, break contacts 224, make contacts 233, and the winding of relay 230 to battery. The timing circuit remains in this condition until interrupter 20 closes contact I24 in order to apply a ground signal to conductor TP2.

The application of a ground signal to conductor TP2 is effective for completing the operating circuit of relay 220 which is traced from conductor TP2 through now closed make contacts 235, break contacts 226, and the winding of relay 220 to battery. The operation of relay 220 is effective for preparing an alternate holding circuit for the lower winding of relay 320 at make contacts 222 and for disconnecting conductor TP1 from the previously described operating circuit for relay 230 at break contacts 203. The operation of relay 220 is further effective for disconnecting the ground supplied to the above-described holding circuit for relay 230 at break contacts 224 and for substituting ground supplied through conductor H1 at make contacts 225. At this time, interrupter 20 has closed contacts I23 in order to apply ground to conductor H1. Thus, relay 230 remains in its operated condition until interrupter 20 opens contacts I23.

When interrupter 120 opens contacts I23, the substitute holding circuit for relay 230 is opened so that relay 230 releases. The release of relay 230 is effective at this time for substituting a holding ground from conductor H2 by way of now closed make contacts 222 and break contacts 232 for the ground previously supplied through make contacts 231. Relay 320 remains in its operated condition because interrupter 20 has closed contacts I21 at this time. Relay 320 is held operated until the operation of interrupter 20 has progressed to the point where contacts I21 are opened. Relay 320 thereupon releases.

The release of relay 320 marks the end of the timed period during which the emergency service lines are connected to each other through the common input channel. The release of relay 320 is effective in the next described manner for releasing the auxiliary line circuits and disconnecting the emergency service lines from the common input channel.

The above-described release of relay 320 is effective for removing ground from the various actuating conductors such as BY20 and BY21 connected to the busy test and ring trip relay locking circuits within the various auxiliary line circuits. Thus within auxiliary line circuit ALC1, relays 430 and 530 are released at ths time. The release of relay 320 is further effective for disconnecting common tone lead CTL20 from the various tone conductors so that tone is no longer applied to the emergency service receiving lines, even though the busy test relay within the auxiliary line circuits are released. Thus, conductor CTL20 is disconnected from the tone lead TN20 of circuit ALC1 at make contacts 321. The release of relay 320 is further effective for disconnecting the 60 IPM ground signal from the winding of relay 210 in the access circuit at make contacts 322 so that relay 210 comes to rest in its released condition.

Within the auxiliary line circuits, the release of the busy test relays, such as 330, is effective for releasing the busy test repeating relays, such as 320, thereby disconnecting the corresponding emergency service line from the common input channel at make contacts, such as 522 and 533. The release of the busy test relays is further effective for reconnecting the windings of those relays to the sleeve conductors of the corresponding circuits at break contacts, such as 531, and for removing direct ground from the same sleeve conductors at now opened make contacts, such as 532.

The release of the ring trip relays, such as 430, restores the above described signaling circuit at break contacts, such as 431 and 435, and further opens the connection between the corresponding emergency service line and the common input channel at make contacts, such as 432 and 436. The release of the ring trip relays is further effective for disconnecting the answering bridge relay of each individual line circuit from the corresponding emergency service lines at make contacts, such as 433 and 434. All the answering bridge relays thereupon release.

The release of all answering bridge relays, such as 410, is effective for removing ground from common supervisory conductor SY20 and therefore causes supervisory relay 310 within the access circuit to release. The release of relay 310 is effective for releasing lockout relay 300 by opening the operating circuit of the latter at make contacts 312, and for further restoring the alternate holding circuit for relay 320 at make contacts 311. The release of relay 310 is further effective for disconnecting conductor TP1 from the above described operating circuit for relay 230 at make contacts 314 and for opening the above described holding circuit for relay 220 at make contacts 315. Relay 220 thereupon releases.

The release of relay 220 disconnects conductor H2 from the above described alternate holding circuit for relay 320 at make contacts 22, reprepares the circuit for connecting conductor TP1 to the winding of relay 230 at break contacts 223, and the first described holding circuit for relay 230 by closing break contacts 224. The release of relay 220 is further effective for repreparing the operating circuit for itself by closing make contacts 226. With the release of relay 220, the timing, access, and auxiliary line circuits are in normal condition and are ready for further use.

In the event that instead of forcing a timed release in the above described manner, all emergency service line station telephones are returned to their hookswitches prior to the completion of the above described operation of the timing circuit but before the release of the connection between the line requesting emergency service and the access circuit, all answering bridge relays, such as 410, within auxiliary line circuit ALC1 are released. The release of all answering bridge relays is effective for removing the ground connections from conductor SY20 and therefore brings about the release of relay 310 prior to the release of switchthrough relay 320. The release of relay 310 is effective for disconnecting conductor TP1 from its above described operating circuit for relay 230 and for opening the first described holding circuit for relay 230 at make contacts 313. Similarly, the holding circuit for relay 220 is opened at make contacts 315 so that relay 220 releases at this time if it has been in operated condition. Under this set of conditions, if relay 230 has been operated, it is now released, thereby restoring the timing circuit to normal so that the forced release of the auxiliary line circuits in the above described manner is prevented. At this time, lockout relay 300 continues to be held in its operated condition through the previously described locking circuit including make contacts 202 and 303 in order to prevent the reapplication of the distinctive reverting tone to the calling line by way of the switching apparatus by holding the above-described reverting tone circuit open at break contacts 301. Relay 320 is held operated at this time, over its above-described operating circuit, and is effective in the above-described manner to hold operated the busy test, busy test repeater, and ring trip relays within any one of the auxiliary line circuits which have already answered and hung up. Thus, the resignaling of answered ones of the emergency service line stations is prevented.

In the event that the calling party has hung up, thereby releasing the switching apparatus and the access circuit, and all emergency service line station telephones are thereafter restored to their hookswitches before the timing operation is completed, the access and auxiliary line circuits are released in much the same way as the one described above with the following exception. At the time that the access circuit seizure responsive apparatus including relay 200 is released, lockout relay 300 remains operated under the control of common supervisory relay 310. During this time, the access circuit may be reseized by other calling stations within the system and a connection extended from the calling station to the common input channel and the unanswered or still-connected emergency service line stations. Assuming that no call is incoming to the access circuit at this time, upon the return of all emergency service line station telephones to their hookswitches, the auxiliary line circuit answering bridge relays, such as 410, are all restored to normal, thereby releasing common supervisory relay 310 in the previously described manner. It is to be noted that both lockout relay 300 and switchthrough relay 320 have been held operated by operated relay 310 at make contacts 312 and 311, respectively. Upon the release of relay 310, the alternate holding circuit of relay 320 is opened at contacts 311. Because relay 300 is a slow release type, the first holding circuit for relay 320 including make contacts 302 is not immediately closed. Relay 320 releases at this time. Thereafter, relay 300 releases, closing the now ineffective first locking circuit for relay 320 at break contacts 302. The timing circuit is restored to its normal condition in the above-described manner. The access and auxiliary line circuits are thereupon normal and ready for further use.

In summary, my invention makes it possible to provide emergency service line signaling from any one of the system stations including one of the emergency service line stations. With the above-described arrangement, it is possible for one of the emergency service line stations, such as A, to extend a call in the above-described manner through linefinder-connector 1 in the switching apparatus to the access circuit and to signal all remaining lines individual to the auxiliary line circuits. The calling emergency service line station A is given a busy indicating tone through its own auxiliary line circuit, such as ALC1, in the above-described manner. However, during the silent or dial tone intervals, the calling station can hear other emergency service stations answer and is informed that the access circuit will be held while his own telephone is hung up. The caller at station A thereupon momentarily returns the telephone to its hookswitch in order to remove the busy indicating ground from the sleeve conductor of the station A line circuit by releasing the switching apparatus. The removal of the busy indicating ground is effective in the above-described manner for bringing about the operation of the busy test relay within the auxiliary line circuit individual to the emergency line station from which the call originated. Thereafter, the station A telephone is immediately removed from its hookswitch in order to trip the ringing signal by operating relay 430 and to extend a connection between the station A telephone and the common input channel by way of the auxiliary line circuit. Thereafter, the call proceeds in the above-described manner and the access circuit releases at the conclusion of the previously described timing operation.

While I have shown and described the preferred embodiment of my invention, other modifications of my invention will readily occur to those skilled in the art.

Accordingly, I aim to cover in the appended claims all modifications that fall within the spirit and scope of my invention.

What I claim is:

1. In a group signaling telephone system, a plurality of lines, each of said lines being individually terminated in a circuit, a station including means for transmitting supervisory signals connected to each of said lines, a channel common to said lines and said circuits, means within each of said circuits for interconnecting the corresponding ones of said lines to said channel in order to interconnect said lines with each other, seizing means for rendering each of said interconnecting means operative, means for thereafter rendering said seizing means inoperative, supervisory means operative in response to the transmission of a supervisory signal from said station connected to any one of said lines for holding said interconnecting means operative, and timing means operative in response to the operation of said supervisory means for rendering said supervisory means ineffective at the end of a predetermined time interval, whereby the interconnection of said lines through said common channel may not be indefinitely maintained.

2. The system set forth in claim 1 wherein said timing means also includes means operative in response to the restoration of said seizing means to inoperative condition for making said timing means operative whereby the timing operation is not started until said seizing means is released.

3. In a group signaling telephone system, a plurality of lines, a station including means for transmitting supervisory signals connected to each of said lines, each of said lines being individually terminated in a line circuit, an access circuit including an input channel common to said lines and said circuits, each of said circuits having means for interconnecting the corresponding one of said lines to said common input channel in order to interconnect said lines with each other, switching apparatus for seizing said access circuit and for extending a connection to said common input channel, switchthrough means within said access circuit for rendering said interconnecting means of each of said circuits operative, means operative in response to the seizure of said access circuit for making said switchthrough means operative, means for releasing said switching apparatus and said seizure responsive means, supervisory means within said access circuit operative in response to the operation of any one of said interconnecting means and to the transmission of an off-hook signal from the corresponding one of said stations for holding said switchthrough means in operated condition, and timing means operated in response to the operation of said supervisory means for rendering said supervisory means ineffective at the end of a predetermined time interval, whereby a connection between any one of said lines and said common input channel may not be maintained indefinitely.

4. The system set forth in claim 1 wherein said timing means also including means operative in response to the release of seizure responsive means for making said timing means operative, whereby the timing operation is not started until said access circuit has been released by said seizing means.

5. In a telephone system including a plurality of lines, each of said lines being individually terminated in a line circuit, a station including means for transmitting supervisory signals connected to each of said lines, and switching means for interconnecting and making busy calling and called ones of said lines, the combination comprising: a plurality of auxiliary line circuits, each of said auxiliary line circuits being individually to certain ones of said lines, an input channel common to said auxiliary line circuits, each of said auxiliary circuits having means for transmitting ringing signals over the corresponding ones of said lines, a tone source, a source of signaling voltage, busy condition detecting means individual to each of said auxiliary circuits effective in a first manner in response to a busy condition for connecting said tone source to the corresponding one of said lines and operative in a second manner in response to an idle condition for connecting said signaling voltage source to the corresponding one of said lines, means individual to each of said auxiliary circuits responsive to the second manner operation of said busy condition detecting means and to the transmission of an off-hook signal for interconnecting the corresponding one of said lines to said common input channel, an access circuit accessible from said switching apparatus for completing a connection from a calling one of said lines to said common input channel, means in said access circuit responsive to seizure by said switching apparatus for rendering operative said busy condition detecting means of each of said auxiliary circuits, means for releasing said switching apparatus and said seizure responsive means, and supervisory means within said access circuit operative in response to the transmission of a supervisory signal from any one of said stations for holding said interconnecting means in operated condition, whereby a calling one of said certain lines may direct said switching apparatus to seize said access circuit and signal the remaining one of said certain lines, receive a distinctive waiting tone, and thereafter establish a talking connection with the others of said certain lines through said common input channel.

6. The system set forth in claim 5 and having in addition timing means rendered operative in response to the operation of said supervisory means for making said holding means ineffective a predetermined time interval after the release of said access circuit seizure responsive means, whereby interconnection of said certain lines through said common input channel may not be maintained indefinitely.

7. In a telephone system, a line terminating in a line circuit, means for making said line circuit busy, a common tone lead, a tone source, a source of ringing voltage, an auxiliary line circuit connected to said line including means effective in the presence of a busy condition on said line for connecting said common tone lead to said line, means including a relay for transferring the connection of said common tone lead between said tone source and said ringing voltage source, a source of periodic signals for driving said connection transferring means, and switchthrough means for rendering said busy condition detecting means operative and for interconnecting said periodic signal source to said connection transferring means, whereby tone and ringing voltage are alternately connected to said line in busy condition when said switchthrough means is operated.

No references cited.

UNITED STATES PATENT OFFICE

CERTIFICATE OF CORRECTION

Patent No. 2,865,999 December 23, 1958

William W. Pharis

It is hereby certified that error appears in the printed specification of the above numbered patent requiring correction and that the said Letters Patent should read as corrected below.

Column 3, line 17, for "appaartus" read -- apparatus --; column 8, line 64, for "ths" read -- this --; column 11, line 60, for "including" read -- includes --; column 12, line 7, for "individually" read -- individual --.

Signed and sealed this 9th day of June 1959.

(SEAL)
Attest:

KARL H. AXLINE
Attesting Officer

ROBERT C. WATSON
Commissioner of Patents